Dec. 19, 1944. E. W. ALLEN 2,365,372
HOLD-DOWN ATTACHMENT
Filed Nov. 12, 1943

Inventor
Everett W. Allen
By
Blackmore, Spencer & Flint
Attorneys

Patented Dec. 19, 1944

2,365,372

UNITED STATES PATENT OFFICE 2,365,372

HOLD-DOWN ATTACHMENT

Everett W. Allen, Birmingham, Mich., assignor to General Motors Corporation, Detroit, Mich., a corporation of Delaware Application November 12, 1943, Serial No. 509,993

6 Claims. (Cl. 45—137)

Mass transportation conveyances have passenger seats fastened to the floor. In motor coaches the fastenings have been such that seat installation requires the coordinate effort of two men, one inside the body and the other beneath the vehicle. An object of the present invention is to save time and cost and simplify seat installation by providing an improved structure whereby a single workman working alone can spot and quickly fasten the seats entirely from within the coach.

A further object of the invention is to provide an anchorage unit as a dependent part of the seat assembly for projection through and firm anchorage to the floor by a resilient bushing formed initially for free passage into the floor opening and arranged for subsequent deformation into tight retaining relation with the floor in a manner to reduce transmission of vibration to the passengers.

Figure 1:
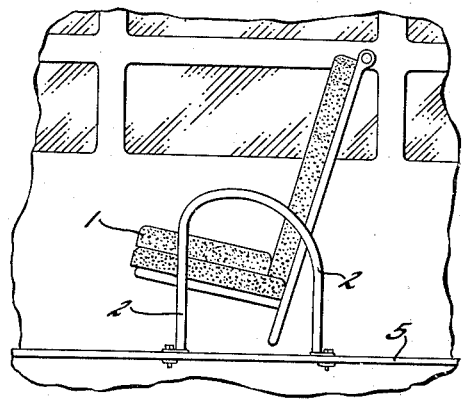
Figure 2:
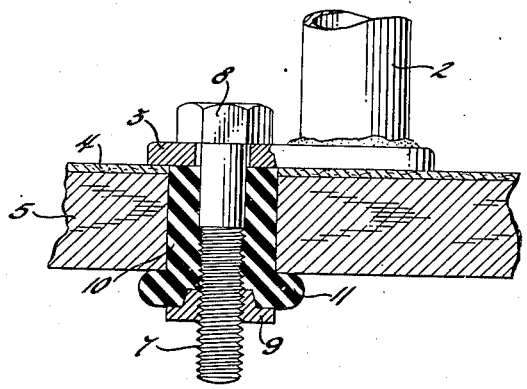
Figure 3:
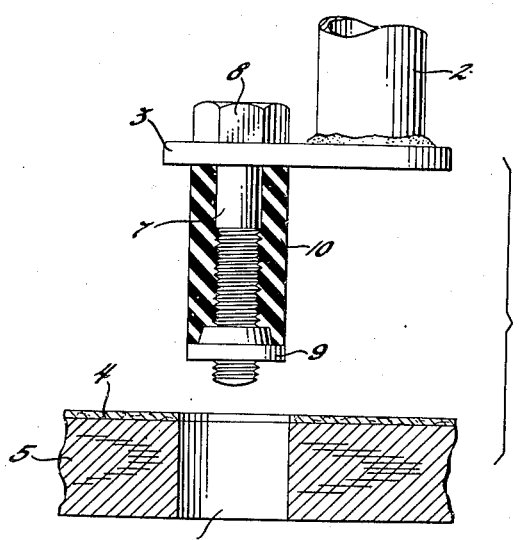

A preferred embodiment is illustrated in the accompanying drawing wherein Figure 1 is a side elevation showing a seat mounted on a coach floor; Figure 2 is an enlarged sectional view of the seat mounting and Figure 3 is a sectional view of the parts prior to final assembly.

Referring to the drawing, the passenger seat 1 has supporting legs 2 terminating in flat attachment or bearing feet 3 which rest on the floor covering 4 laid over a lightweight plywood floor panel 5. Openings 6 are drilled through the floor at predetermined points to line up with and receive downwardly projecting anchoring devices carried by the feet in overhanging relation to the floor openings. As illustrated an inexpensive attachment comprises a rotatable stud 7 hung by its head 8 and projected through the foot 3 with a threaded terminal engaged by a nut 9 and with its shank surrounded by a sleeve or bushing 10 of rubber or other non-metallic elastic deformable material, whose opposite ends seat against the nut 9 and the underside of the foot 3, respectively. Both the nut 9 and the resilient sleeve 10 are of a diameter which substantially corresponds with or is slightly smaller than the diameter of the floor opening 6 to enable free passage through the opening. The length of both the stud and its embracing sleeve is greater than the thickness of the floor 5 so as to extend below the underside of the floor when the bottom of the foot 3 rests on the floor covering 5.

After insertion of the hold-down parts outwardly through the floor from the inside of the coach body engagement of a suitable wrench or other tool with the hexagonal head 8 enables the stud to be rotated and thereby draw back the nut 9 to impose axial force on the rubber sleeve 10 which thereupon spreads or crowds itself to take up radial clearance between the stud and the wall of the opening 6 for a tight fit. In addition the end portion of the bushing below the floor is squeezed out to form an enlarged annular collar or retaining bead indicated at 11 abutting the underside of the floor and resisting upward pull.

Relative rotation between the nut and the stud is had by reason of frictional contact of the nut with the end of the sleeve. If desired the upper face of the nut may be knurled or roughened for increased friction. However, a special form of nut is unnecessary and an ordinary standard commercial nut of just the right size to pass nicely through the floor opening may be used. Optionally the nut may be surface bonded, as by vulcanization, to the end of the rubber sleeve. In addition the opposite end of the rubber sleeve can be bonded on the underside of the foot 3.

The floor covering 4 preferably is of such character that it aids in reducing transmission of vibration but in installations where floor covering is not employed insulation may be provided in the form of a thin rubber pad placed beneath the foot 3 and formed either as a separate piece or as an integral part of the rubber sleeve 10. The addition of such pad is not deemed essential at the present time because of the almost universal use of floor covering as referred to and the savings in cost is important since the simple form of initially cylindrical rubber sleeve as illustrated can be extruded inexpensively and then cut to proper length. Removal or replacement of parts obviously are contemplated and may be easily accomplished as will be apparent.

I claim:

1. A passenger seat floor attachment, including a floor having attaching openings therein, a seat having supporting legs terminating in flat bottomed feet to rest on the floor with projecting extensions overlying said openings, a rotatable stud depending from each extension and through the floor opening with its tool engaging head seated on said extension, a non-metallic deformable bushing having a preformed initial size of a diameter substantially corresponding to that of said floor opening and of a length slightly greater than the floor thickness, said bushing embracing the stud to fit the floor opening with one end abutting the underside of said extension, and a nut abutting the other end of the bushing and being of substantially the diameter thereof for passage through the floor opening, said nut being threaded on the lower end of the stud for adjustment toward the extension upon stud rotation for squeezing the bushing axially and causing its radial growth with the growth between the nut and the underside of the floor forming an enlarged retaining collar.

2. In combination, a base panel having an opening therethrough, a bushing of rubber or the like preformed initially of a diameter to pass freely through said opening and of a length greater than the thickness of the panel at said opening so as to project therebeyond when inserted in the opening, an attachable member to be secured to the base panel affording a seating for the outer end of the bushing, a nut engaging the inner end of the bushing and being of smaller size than the opening for passage therethrough and an adjustable stud securing the nut to the member and being adjustable from the member side of the base panel to draw the nut toward said member and thereby crowd the projecting inner end portion of the bushing and deform the same as an enlarged retaining collar of a diameter greater than the diameter of said opening and bearing on the inner side of said base panel.

3. In combination with two members to be joined, of a projecting stud carried by one member to project through an opening in the other member, a bushing of rubber or the like surrounding said stud to fit said opening and extended outward beyond the far side thereof, a nut adjustable on the stud and seated on the far end of the bushing, insertable through said opening for subsequent upward adjustment and an enlarged retaining collar afforded by a pressure deformation of the extended far end of the bushing to engage the far side of the last mentioned member incident to said nut adjustment.

4. In combination with a pair of members to be joined, of a stud rotatably mounted on one of said members for projection through an opening in the other member, a nut threaded on the end of the stud and smaller than said opening for passage therethrough, a sleeve of non-metallic elastic deformable material retained by the nut in embracing relation to the stud for introduction into the opening as an assembly with the stud and nut, entirely from one side of the member containing said opening, means to rotate the stud from said side and thereby draw back the nut for crowding the sleeve into said opening and a retaining collar on the end of the sleeve projected beyond said last mentioned member and raised to a size greater than the opening therethrough by a deformation of the sleeve and under said crowding action.

5. The structure of claim 4 wherein the abutting surfaces of the sleeve and nut are bonded by surface union to resist rotation of the nut upon relative stud rotation.

6. The structure of claim 4 wherein the opposite end faces of the sleeve are bonded to the nut and the stud carrying member, respectively to insure non rotation of the nut upon relative stud rotation.

EVERETT W. ALLEN.